Nov. 3, 1964 K. GREIS 3,154,988
SHEET METAL SHEARS
Filed Sept. 20, 1961 2 Sheets-Sheet 1

Nov. 3, 1964 K. GREIS 3,154,988
SHEET METAL SHEARS
Filed Sept. 20, 1961 2 Sheets-Sheet 2

United States Patent Office 3,154,988
Patented Nov. 3, 1964

3,154,988
SHEET METAL SHEARS
Karl Greis, St. Ingbert, Saar, Germany, assignor to Verwaltungsgesellschaft Moeller und Neumann Offene Handelsgesellschaft, St. Ingbert, Saar, Germany
Filed Sept. 20, 1961, Ser. No. 139,399
7 Claims. (Cl. 83—216)

The present invention relates to metal shear assemblies for use with conveying means for sheet metal strips, and particularly plates.

The invention is concerned with the problem of the space requirement and construction costs of shearing lines for sheet metal strips. Shearing lines always include two trimming shears arranged on opposite sides of the track or conveyor and at least one cross-cut shear is always a guillotine shear while the trimming shears may be disc-type shears or guillotine shears depending upon the thickness of the sheet metal strip. In the case of sheet metal strips having a thickness over 20 mm., guillotine shears have been employed as trimming shears since the use of disc-type shears in cutting thick sheet metal strip is not deemed advisable.

The space requirement of a shearing line is dependent on the maximum length of the metal sheet or plate to be rolled and if guillotine shears are employed as trimming shears, the total length of the shearing line is greater than three times the maximum metal sheet length. The two trimming shears must be arranged spaced from each other by the amount of the length of the sheet metal and remote from the line so that first one and then the other border of the sheet metal can be trimmed and the cross-cut shear must be located behind the last trimming shears by at least the length of the metal sheet.

Disc-type shears are always located opposite each other and consequently when using disc-type shears, the length of the shearing line is reduced to about two-thirds the length of a line employing guillotine shears as the trimming components.

Double shear installations in lines utilizing guillotine shears for simultaneously trimming a sheet metal strip along both borders and in which one of the shears may be adjusted for different widths of sheet metal strip are known. Such double shear installations have been constructed in a few situations for thin metal sheets the length of which is less than the cutter length of the shears. Such installations are not suitable for trimming thick sheet metal strips or plates since such a work piece is not able to move out of the way following the cut and upon the return stroke of the cutting component. The cutting component must slide along the cut edge of the metal strip during the return stroke and would in such a situation be subjected to particularly great wear. A thin sheet metal strip, on the other hand, will bend slightly at the edge during the return stroke of the cutting component so that during the return stroke no excess friction is produced between the cutting component of the edge of the strip.

An object of the invention is to provide a shearing line for thick sheet metal strips with trimming shear means each embodying a stationary knife and a movable knife, such shear means being mounted on opposite sides of the line, and in which the movable knife does not travel along the cut edge during the return stroke.

Another object of the invention is to provide trimming shears of the type under consideration which are so constructed and arranged that the movable knife is returned during each return stroke in a plane which is displaced away from the cutting plane.

In connection with known metal shears having knives fixed to a tiltable arm mounted on a shaft extending parallel to the line of cutting and rigidly supported, the present invention comprehends the displacement of such shaft and tiltable arm during the return stroke of the knife away from the cut edge and before the cutting stroke again in the cutting plane.

Essentially, all of the displacements of the knife which occur during the return stroke may be controlled manually although such operations may be controlled automatically through the cutting drive.

The present shears construction may be advantageously used in all situations in which the material to be cut remains stationary by virtue of its own weight, or as in the case of a shearing line, due to a clamping action during the cutting operation. The foregoing is a prerequisite for obtaining straight cutting lines in the situation of sheet metal strips which are to be provided with an edge in successive cuts. In all such situations, the friction of the cutting knife on the cut surface during the return stroke is undesirable and is avoided by the invention.

The shears construction of the invention is particularly suitable for use in shearing lines for thick sheet metal strips wherein the shears are oppositely arranged so that friction and buckling of the metal sheet along both edges are prevented, thereby eliminating wear and allowing straight cuts to be effected.

Further objects and advantages of the invention will become more readily apparent from the following detailed description and annexed drawings illustrating an embodiment of the invention employing a crank drive and in which drawings.

Figure 1:
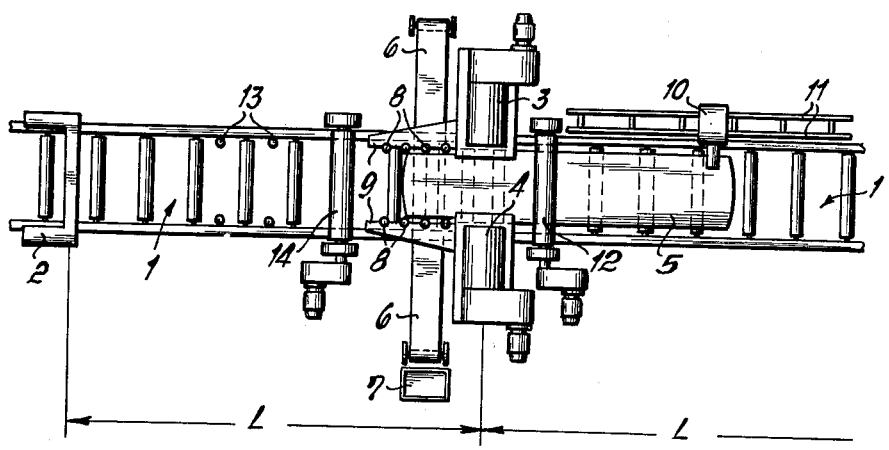
FIG. 1 is a diagrammatic plan view of a shearing line provided with oppositely arranged edging shears.

Referring to FIG. 1, a roller track or conveyor 1 for sheet metal strip 5 is provided at one end thereof with cross-cut shears 2. Within the confines of the maximum length L of the track 1 and in advance of the shears 2, there are arranged oppositely disposed trimming shears 3 and 4 for cutting the edges of the sheet simultaneously. The distance between the trimming shears is adjustable.

Severed edge strips or scrap can be conducted by a chute (not shown) adjacent the track 1 to a belt 6 movable transversely of the track for deposit in a bin 7. The scrap can be removed from the bin for introduction into a furnace.

Vertical guide rollers 8 for the cut edges of the sheet 5 are supported by extending arms 9 which are secured to the uprights of the trimming shears 3 and 4 so that when the shears are adjusted to the desired width, the rollers will simultaneously be adjusted. To make certain that the subsequent cut is in line with the first cut, there is included in conjunction with the trimming shears a clamping device 10 of known type. The clamping device 10 is adapted to ride on rails 11 mounted alongside the track 1 in parallelism to the track, and the strip 5 is guided parallel to the track by means of a magnet or dog. The strip 5 is advanced along the track 1 by a pair of driving rollers, and numerals 12 and 14 indicate the upper rollers of such advancing means.

To provide for proper guiding of the strip 5 when the clamping device 10 is disconnected and when the end of the strip is free, additional vertical guide rollers 13 are located on the track 1 between the trimming shears and the cross-cut shears 2.

The metal strip may be advanced in any desired manner and in view of the driving rollers illustrated, the clamping device 10 may include a drive means, and the rails 11 extend very close to the trimming shears 3. For the final part of the advancing movement of the free end of the strip, driving rollers may be provided within the cutting length, with such driving rollers being mounted on the shears in an overhanging fashion.

The trimming shears 3 and 4 are located rearwardly of the start of the track for the shearing line by the length L so that the total length of the shearing line is not greater than twice the maximum length of the metal strip.

Figure 3:
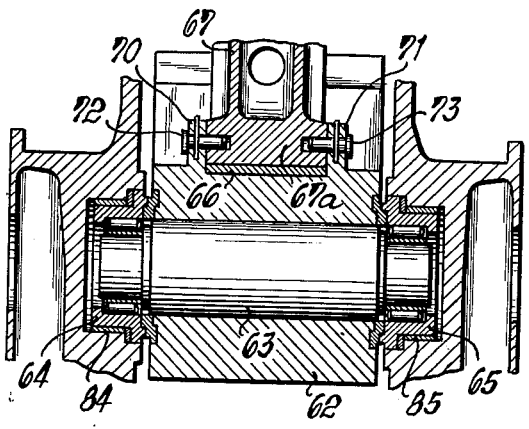
FIG. 3 is a sectional view showing further details of the knife support mounting.
Figure 2:
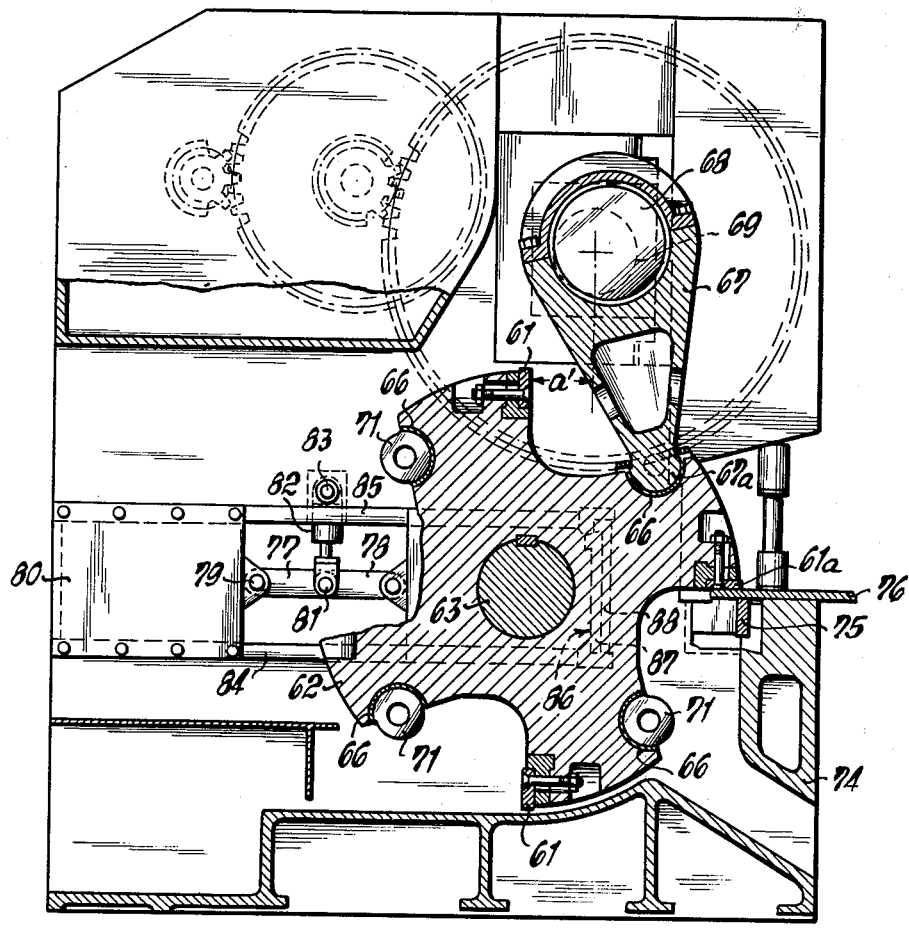
FIG. 2 is a part vertical sectional and part elevational view of one of the shears.

Referring more especially to FIG. 2 which shows in detail the structure of the trimming shears, a drum-like, star-shaped knife support 62 is adapted to receive four upper knives 61, and the four swinging arms of the knife support constitute a unitary component. The knife support is mounted freely rotatable by a shaft 63 mounted in lateral bearing members 64 and 65 (FIG. 3). On the back side of each arm of the knife support, semi-circular bearing pans 66 are provided in a radial space from the knife support shaft 63 which radial space is as large as possible. The bearing pans 66 support a lower semi-cylindrical end portion 67a of a ram 67 which is mounted on an eccentric member 68 of a crank shaft by means of a center shaft 69. Obviously, it is possible to employ a hydraulic drive having oscillating cylinders. A quickly releasable connection of ram 67 to the arms of the knife support 62 is shown in FIG. 3. The knife support 62 is provided with two bearing journals 70 and 71 in the area of the bearing pan 66 in the space of the width of the lower ram end 67a. In order to take the knife support 62 along during the return stroke of the ram, the bearing journals 70 and 71 and the ram are connected by bolts 72 and 73 which are fixed into the face of the ram end.

Only one upper knife 61a cooperates with a lower knife 75 mounted in a shearing support 74 for the purpose of severing the edge of a thick sheet metal strip 76. The remaining upper knives, preferably always the knife which lies diametrically opposite the working knife 61a, is exchanged during a stoppage in operation. If it is demonstrated that the cooperating knives are worn it is only necessary to remove the lower knife 75 and replace the same while a new upper knife may be brought into a working position merely by rotating the knife support 62, after having previously loosened bolts 72 and 73 and after having connected the ram to the succeeding bearing pan 66. The replacing of the lower knife 75 is not difficult because the freely rotatable knife support 62 may be brought into the position in which the space between the two arms, which resembles the gap between adjacent teeth, lies at the level of the lower knife 75 and permits ready access to the lower knife.

To move the knife support 62 away from the edge during the return stroke of the ram 67 and the working upper knife 61a, toggle levers 77 and 78 are connected to the bearing members 64 and 65. One lever 77 is supported at 79 rigidly on releasable plates 80 or on the shear housing. Hydraulic controllable drives 82 engage the pivot portions 81, and the cylinders of the drive are oscillatably suspended as at 83. The bearing members 64 and 65 are guided in horizontal guides 84 and 85 so that they may be moved by the components 77 through 82 for displacing the knife support 62 away from the edge of the strip 76.

During the cutting operation, the toggle levers 77 and 78 are immediately before their straight position when the bearing members 64 and 65 abut against limit surfaces 86 of their guides 84 and 85. In this manner, play is eliminated in the joints of the lever arrangement if the hydraulic drives 82 exert a lasting pressure. The position of the limit surface 86 determines the horizontal knife play. In view of the fact that during the swinging cut it may be preferable in contrast to the straight cutting operation to change the knife play depending on the thickness of the metal strip, adjustable flat wedge members 87 and 88 are provided on the limit surfaces 86, and the limit position of the bearing members 64 and 65 of the shaft 63 may be changed by means of these wedge members.

The controllable hydraulic drives 82 for displacing the knife support are regulated in dependence on the movements of the ram. In the lower dead position (after the cut has been made), the hydraulic drives are connected in the direction of an upward movement of the pivot portions 81 of the levers 77 and 78, while in the upper dead position, a reversal takes place and the toggle levers are straightened. Immediately prior to the straightened position, the bearing members 64 and 65 abut against the limit surface 86 and the knife support 62 is rigidly supported during the cutting operation while there is the desired play.

Figure 4:
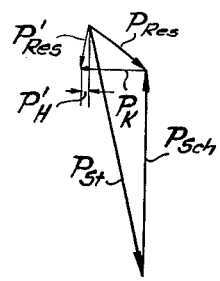
FIG. 4 is a diagram of the power cycle.

With reference to FIG. 4, by a setting of the crank drive for the ram 67 by a value $a$ in a clockwise rotation of the eccentric member 68, ram pressure $P_{St}$ combines with the opposite shear pressure $P_{Sch}$ and results in a horizontal component which is opposite and somewhat larger than the smallest spring pressure $P_K$. In this manner, it is obtained that during the cutting operation only negligible horizontal forces arrive at the toggle levers 77 and 78 so that the same are not stressed and all the play is equalized. The ram pressure $P_{St}$ and the shear pressure $P_{Sch}$ combine to produce a resultant $P_{Res}$ which would have to be absorbed by the bearings of the knife support shaft 63 when the spring pressure is not considered. The spring pressure $P_K$ which is somewhat larger than the horizontal component of the resulting bearing pressure $P'_{Res}$ acts in opposition to the bearing force and combines with the same to form a resultant $P_{Res}$. This resultant comprises a vertical component which is to be absorbed by the bearings and a horizontal component $P'_H$ which is directed to the toggle levers 78 and 77 or to the hydraulic drives 82 and is very small as may be seen. If in the case of worn knives the spring pressure increases, this component $P'_H$ becomes somewhat larger.

A further advantage of the present shear construction is that the guides 84 and 85 for the bearings 64 and 65 are conducted through to the free shear side and thus the knife support 62 may be easily erected rearwardly.

The invention is not to be confined to any strict conformity of the showings in the drawings but changes or modifications may be made therein so long as such changes mark no material departure from the spirit and scope of the appended claims.

What I claim is:

1. In an apparatus for trimming the edges of metal sheets, a conveying means for said sheets and trimming shear means disposed on opposite sides of said conveying means for progressive step by step shearing of the edges of said sheet, each of said shear means including a fixed knife and a movable cooperating knife operable in one direction during a cutting stroke to shear the edge of said sheet and in the opposite direction during the return stroke, means to move said movable knife laterally toward said fixed knife at substantially right angles to the path of cutting movement prior to the cutting stroke and in the opposite direction away from said fixed knife and the cut edge of said sheet during the return stroke and means to adjust the spacing between said fixed and movable knives.

2. In an apparatus as defined in claim 1, a carrier for said movable knife mounted for movement toward and away from said fixed knife at substantially right angles to the path of cutting movement and said means to adjust the spacing between said fixed and movable knives including at least one pair of engaging relatively slidable wedge members disposed in the path of movement of said carrier to adjustably limit movement of said carrier toward said fixed knife.

3. Shear means for progressive step by step shearing of the edge of a metal sheet, said shear means including a shaft disposed parallel to the path of movement of said sheet, a movable knife support carried by said shaft, said support including angularly spaced radial arms, a movable knife mounted on each arm, a stationary knife mounted for cooperation with the movable knife on one of said arms, a reciprocating drive means for oscillating said knife support and means on each arm for selectively connecting said drive means to each arm, whereby with said drive means connected to said one arm and upon operation of said drive means the movable knife on said one arm will move with respect to said fixed knife to shear the edge of said sheet.

4. In an apparatus for trimming the edges of metal sheets, a conveying means for said sheets and trimming shear means disposed on opposite sides of said conveying means for progressive step by step shearing of the edges of said sheet, each of said shear means including a shaft disposed parallel to the path of movement of said sheet, a movable knife support carried by said shaft, said support including angularly spaced radial arms, a movable knife mounted on each arm, a stationary knife mounted for cooperation with the movable knife on one of said arms, a reciprocating drive means for oscillating said knife support, means on each arm for selectively connecting said drive means to each arm, whereby with said drive means connected to said one arm and upon operation of said drive means the movable knife on said one arm will move with respect to said fixed knife to shear the edge of said sheet, means for moving said support and movable knife away from said fixed knife at substantially right angles to the path of cutting movement during the return stroke of said movable knife to prevent contact between said movable knife and the cut edge of said sheet during the return stroke of said movable knife, said last named means also being operable to move said support and movable knife toward said fixed knife into operative cutting position prior to the cutting stroke and means for adjustably limiting movement of said support and movable knife toward said fixed knife to adjust the spacing between said fixed and movable knives.

5. In an apparatus as defined in claim 4, bearings for said shaft, guideways for slidably mounting said bearings, power means for moving said bearings, shaft, support and movable knife toward and away from said fixed knife, said limiting means including one pair of engaging relatively slidable wedge members disposed between each bearing and abutments on said guideways.

6. In an apparatus as defined in claim 5, said power means including toggle linkage connected to said bearings and to a fixed member and drive means connected to the central pivot point of said toggle linkage.

7. In an apparatus as defined in claim 6, said limiting means being so proportioned as to prevent movement of said toggle linkage to dead center position at any adjusted position of said limiting means.

References Cited in the file of this patent

UNITED STATES PATENTS

| | | |
|---|---|---|
| 814,813 | Swift | Mar. 13, 1906 |
| 1,341,312 | Glines | May 25, 1920 |
| 2,497,155 | Davis | Feb. 14, 1950 |

FOREIGN PATENTS

| | | |
|---|---|---|
| 1,177,131 | France | Apr. 21, 1959 |